United States Patent
Hontele et al.

(10) Patent No.: US 11,039,516 B2
(45) Date of Patent: Jun. 15, 2021

(54) SOLID STATE LIGHTING CIRCUIT AND CONTROL METHOD

(71) Applicant: SIGNIFY HOLDING B.V., Eindhoven (NL)

(72) Inventors: Bertrand Johan Edward Hontele, Breda (NL); Theo Gerrit Zijlman, Tilburg (NL); Berend Jan Willem Ter Weeme, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/763,203

(22) PCT Filed: Nov. 8, 2018

(86) PCT No.: PCT/EP2018/080630
§ 371 (c)(1),
(2) Date: May 11, 2020

(87) PCT Pub. No.: WO2019/092114
PCT Pub. Date: May 16, 2019

(65) Prior Publication Data
US 2020/0337131 A1    Oct. 22, 2020

(30) Foreign Application Priority Data

Nov. 13, 2017  (EP) ..................................... 17201305

(51) Int. Cl.
*H05B 45/325* (2020.01)
*H05B 45/3577* (2020.01)
(Continued)

(52) U.S. Cl.
CPC .......... *H05B 45/325* (2020.01); *H05B 45/10* (2020.01); *H05B 45/3577* (2020.01); *H05B 45/375* (2020.01)

(58) Field of Classification Search
CPC ........ H05B 45/37; H05B 45/48; H05B 45/22; H05B 45/24; H05B 45/38; H05B 45/46;
(Continued)

(56) References Cited

U.S. PATENT DOCUMENTS 6,137,245 A * 10/2000 Hsieh ..................... G09G 1/005
315/383
9,763,296 B1    9/2017 Milanesi et al.
(Continued)

FOREIGN PATENT DOCUMENTS

EP    2723146 A1    4/2014
WO    2011092606 A1    8/2011
(Continued)

*Primary Examiner* — Wei (Victor) Y Chan
(74) *Attorney, Agent, or Firm* — Daniel J. Piotrowski

(57) ABSTRACT

A lighting circuit makes use of a switch mode power converter to drive a solid state lighting arrangement having a lighting unit and a lighting control switch. A pulse width modulation control signal is applied to the lighting control switch for dimming control with an activation pulse during which the lighting unit is activated. The power converter delivers a triangular current waveform and the activation pulse is delayed until a predetermined point within the triangular current waveform. This ensures that the PWM pulse during which the lighting arrangement is turned on has timing which is synchronized with the timing of the switch mode power converter. The prevents beat frequencies so that visible flicker is avoided.

15 Claims, 3 Drawing Sheets

(51) Int. Cl.
*H05B 45/10* (2020.01)
*H05B 45/375* (2020.01)

(58) Field of Classification Search
CPC .. H05B 41/3927; H05B 45/50; H05B 41/042; H05B 41/2827
USPC ............ 315/307, 294, 186, 224, 200 R, 201
See application file for complete search history.

(56) References Cited

U.S. PATENT DOCUMENTS

| | | |
|---|---|---|
| 2009/0179575 A1 | 7/2009 | Mednik et al. |
| 2011/0109247 A1 | 5/2011 | Hoogzaad et al. |
| 2012/0104958 A1 | 5/2012 | Zudrell-Koch et al. |
| 2012/0217889 A1 | 8/2012 | Jayabalan et al. |
| 2013/0038234 A1 | 2/2013 | Van Der Veen et al. |
| 2014/0111110 A1 | 4/2014 | Qi et al. |
| 2017/0006683 A1 | 1/2017 | Shiyu et al. |

FOREIGN PATENT DOCUMENTS

| | | |
|---|---|---|
| WO | 2015171999 A1 | 11/2015 |
| WO | 2016142154 A1 | 9/2016 |

\* cited by examiner

SOLID STATE LIGHTING CIRCUIT AND CONTROL METHOD

CROSS-REFERENCE TO PRIOR APPLICATIONS

This application is the U.S. National Phase application under 35 U.S.C. § 371 of International Application No. PCT/EP2018/080630, filed on Nov. 8, 2018, which claims the benefit of European Patent Application No. 17201305.4, filed on Nov. 13, 2017. These applications are hereby incorporated by reference herein.

FIELD OF THE INVENTION

This invention relates to solid state lighting circuits, and in particular dimmable lighting circuits.

BACKGROUND OF THE INVENTION

Solid state lighting units, and in particular LED-based (retrofit) lamps, are used more and more in home buildings and offices. Besides their high efficiency, they also attract consumers due to new design features, different color temperatures, dimming ability etc.

To fit LED lighting to existing mains lighting fixtures, each LED light unit makes use of a converter circuit, for converting the AC mains into a DC drive signal, and also for reducing the voltage level.

The converter circuit typically comprises a rectifier and a switch mode power converter such as a buck converter.

The switching nature of switch mode power supplies results in a non-constant power delivered to the LEDs. A ripple current is provided through the LEDs which depends on the converter topology, the control method and amount of filtering at the output.

Dimming or color control can be achieved by adjusting the amplitude of the average current, or by applying a form of pulse width modulation (PWM). It is known for example to apply a pulse width modulation to a shunt switch, so that an LED or LED string is bypassed at controlled times, thereby providing a light output with duty cycle control.

In general, a PWM approach gives more consistent results than amplitude control, especially if deep dimming levels need to be obtained.

WO2016/142154 and US2012/0104958 show examples of power converter that are switched on and off according to a PWM signal used for controlling the light level. Such circuits necessitate to have one power converter for a single LED branch. For colored light using several kinds of LEDs RGB, RGBW or only two kind of LEDs having different color temperature, it is expensive and not applicable to small light source like bulbs. Another drawback is that the startup of the power converter must be fast and controlled for avoiding some fluctuation of light.

WO 2011/092606 shows an example of power converter wherein the power converter in independent of the PWM control but it needs to delay the pulse width modulation needs to be delayed till the end of the stamp period of the power converter In one known implementation, a power converter in the form of buck converter is used, having a triangular shaped output current with an average value and a hysteresis band. Shunt switching is applied for controlling brightness of the series connected LEDs, and no output smoothing capacitor is then used. This is for example disclosed in US2011/0109247.

The buck converter switching frequency is determined by the value of the inductor in the buck converter circuit, the input voltage and the output voltage. Due to the operation of the shunt switching, the instantaneous output voltage will change in response to the switching actions, and this will lead to different switching frequencies of the switch mode converter. The PWM shunt control however operates at a fixed frequency.

Typically, the switch mode converter frequency is much higher than the PWM frequency. For example, a typical switch mode converter frequency is 200 kHz and a typical PWM frequency is 1 kHz.

At very low dimming levels, the PWM pulse duration will approach or even drop below the buck converter switching cycle period. This results in under sampling of the buck converter frequency which can lead to low frequency current variations and hence visible flicker, in particular in the form of beat frequencies.

There is therefore a need for a lighting driver circuit which enables deep dimming without visible lighting flicker resulting.

SUMMARY OF THE INVENTION

The invention is defined by the claims.

According to examples in accordance with an aspect of the invention, there is provided a lighting circuit, comprising:

a switch mode power converter having a main control switch;

a solid state lighting arrangement comprising a lighting unit and a lighting control switch, at the output of the power converter;

a pulse width modulation controller for providing a pulse width modulation control signal to the lighting control switch for controlling dimming of the solid state lighting arrangement, the pulse with modulation control signal having a predetermined frequency and period and comprising pulses during which the lighting unit is activated;

a power converter controller for controlling the main control switch independently of the pulse width modulation control signal, wherein the switch mode power converter is adapted to deliver a triangular current waveform which cycles between upper and lower threshold currents, and wherein the pulse width modulation controller is adapted to delay the start of each of the pulses until a predetermined point within the triangular current waveform.

This lighting circuit ensures that the PWM pulse during which the lighting arrangement is turned on has timing which is synchronized with the timing of the switch mode power converter main control switch. In this way, beat frequencies resulting from frequency differences between the pulse timing and the switching frequency are prevented, so that visible flicker is avoided.

Note that the triangular current waveform does not necessarily need to have linear transitions between the upper and lower thresholds. The term "triangular" is only meant to denote a rise from the lower threshold to the upper threshold, at which switching takes place, so that there follows a drop to the lower threshold, at which switching again takes place (and so on).

The pulse is for example at the start of the pulse with modulation control signal, and the pulse width modulation controller is adapted to delay the start of the pulse until said predetermined point within the triangular current waveform.

The PWM signal maintains the same period but the timing of the start of the pulse is altered. The pulse is maintained with the same duration.

Note that an alternative approach is to delay the start of the overall PWM signal until a particular timing point is reached, so that the pulse is still provided at the beginning of the PWM period. In this case, the overall period of the previous PWM signal may be considered to have been extended by the delay. This latter alternative means a slight change to the effective PWM period, but the duration of the change is at most one period of the switch mode converter switching signal, which is very small compared to the PWM period.

The pulse width modulation controller is for example adapted to delay the start of the pulse until the triangular current waveform reaches a next upper or lower threshold current. In particular, the start of the pulse may be delayed until the triangular current waveform reaches a next upper threshold current. This provides a simple to implement control approach.

The power converter controller may be adapted to switch the main control switch at the start of the pulse with modulation control signal. This causes the output current to rise straight away, thus shortening the delay until the next time the upper threshold current is reached. In this way, the delay introduced before the PWM pulse is active is reduced, thereby reducing the effect on the light output brightness.

The power converter controller may operate at a frequency of at least 100 kHz (e.g. 200 kHz to 500 kHz) and the predetermined frequency of the pulse width modulation controller may be at most 25 kHz (e.g. 1 kHz).

The solid state lighting arrangement may comprise a plurality of lighting units in series, each with a respective lighting control switch mounted in parallel on each lighting unit. This provides a shunt control approach. Each lighting unit for example has a different output color. The PWM control is thus able to implement color and/or dimming control. An alternative approach may make use of a serial switching approach, wherein a plurality of lighting units are in parallel, and each parallel branch is controlled by its own respective series switch. This is suitable for a voltage controlled converter.

The switch mode power converter may comprise a buck converter.

The invention also provides a method of controlling a lighting circuit, comprising:

operating a switch mode power converter having a main control switch to deliver power to a solid state lighting arrangement which comprises a lighting unit and a lighting control switch, wherein the power converter delivers a triangular current waveform which cycles between upper and lower threshold currents;

operating a pulse width modulation controller for providing a pulse width modulation control signal to the lighting control switch for controlling dimming of the solid state lighting arrangement, the pulse with modulation control signal having a predetermined frequency and period and comprising pulses during which the lighting unit is activated; and wherein the switch mode power converter is controlled independently of the pulse width modulation control signal and wherein the method further comprises delaying the start of each of the pulses until a predetermined point within the triangular current waveform.

This method enables dimming to be implemented without introducing flicker, even when deep dimming is implemented, with a short activation pulse.

Note that for a lighting arrangement having multiple channels, the start time of the pulse for those different channels may be different, so that they have a different phase relationship to the PWM period.

The pulse (for one channel or for all channels of a multiple channel system) may be at the start of the pulse with modulation control signal, and the method then comprises delaying the start of the pulse until said predetermined point within the triangular current waveform, which is for example a next upper or lower threshold current, and preferably a next upper threshold current.

The method may comprise switching the main control switch of the power converter at the start of the pulse with modulation control signal. This reduces the delay until the predetermined point within the triangular current waveform.

The method for example comprises operating the power converter controller at a frequency of at least 100 kHz and operating the pulse width modulation controller at a lower predetermined frequency. This lower frequency may be above the audible range (of 20 kHz) such as below 25 kHz, or it may be a lower frequency within the audible range, and hence below 20 kHz, for example below 5 kHz.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
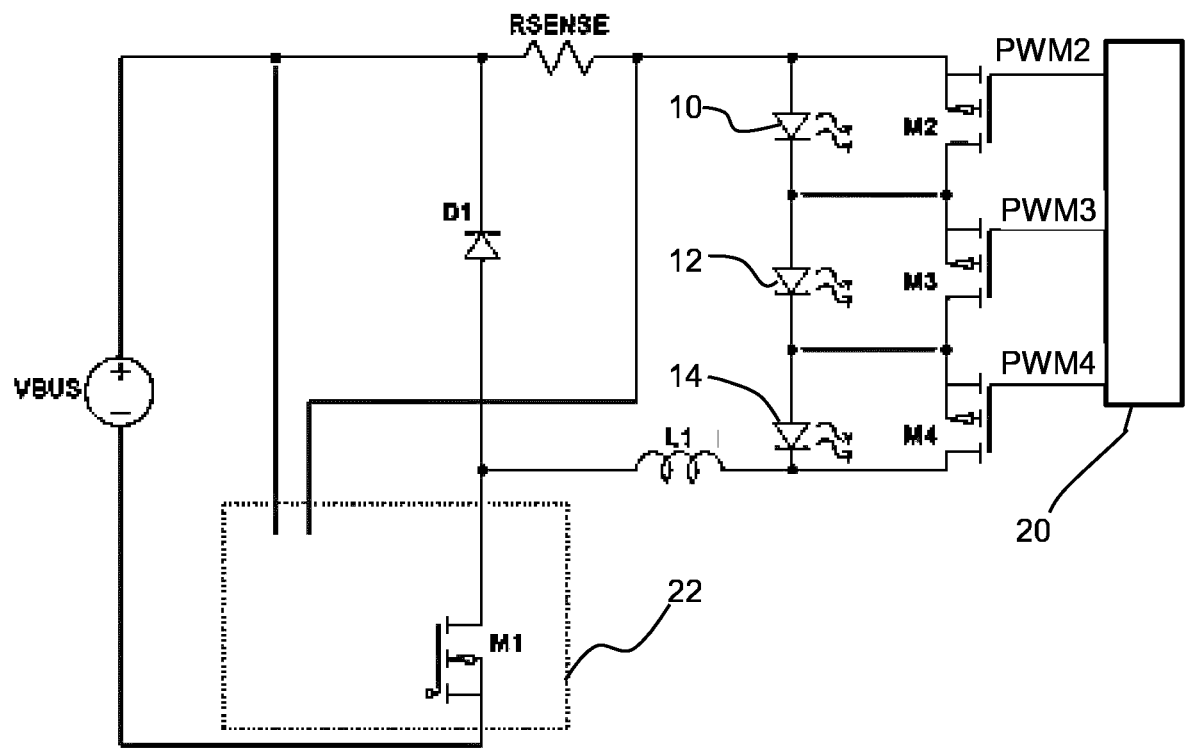
FIG. 1 shows a known lighting circuit.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting circuit which makes use of a switch mode power converter to drive a solid state lighting arrangement having a lighting unit and a lighting control switch. A pulse width modulation control signal is applied to the lighting control switch for dimming control with an activation pulse during which the lighting unit is activated. The power converter delivers a triangular current waveform and the activation pulse is delayed until a predetermined point within the triangular current waveform. This ensures that the PWM pulse during which the lighting arrangement is turned on has timing which is synchronized with the switching timing of the switch mode power converter. The prevents beat frequencies so that visible flicker is avoided.

The lighting control is for example a parallel shunt switch.

FIG. 1 shows a known lighting circuit. The circuit is driven by a DC supply, VBUS, which itself may be a rectified mains signal.

A switch mode power converter such as a hysteretic converter comprises a main control (power) switch M1, an energy storage device in the form of an inductor L1 and a flyback diode D1. These components together define a buck converter architecture. Alternatively, the diode D1 may be replaced by a second main control switch to implement a synchronous buck converter.

The output of the buck converter drives a solid state lighting arrangement comprising a lighting unit having a series connection of a blue LED 10, a green LED 12 and a red LED 14. In the example shown, each LED has a parallel shunt switch M2, M3, M4. Of course, each LED as shown may in practice comprise a series string of LEDs. For simplicity, each LED shown in FIG. 1 will be referred to as a single LED.

The shunt switches are controlled by PWM signals PWM2, PWM3, and PWM4, and these are provided by a pulse width modulation controller 20. When the PWM signal switches on the associated shunt switch, the LED is bypassed and hence turned off. Thus, the on-off duty cycle of the LEDs is controlled by the PWM signals, to provide dimming control for each LED and hence for providing color control for the overall set of LEDs.

The color control may be used to adjust the color temperature for a generally white output, or it may be used for providing different color outputs. The color control may vary in dependence on the dimming level to provide intelligent dimming, for example to replicate the dimming performance of traditional incandescent bulbs, or to provide other effects.

The circuit may of course also be applied to a single color system to provide only dimming control. The pulse with modulation control signal has a predetermined frequency and period.

A power converter controller 22 is provided for controlling the main control switch M1. The power converter controller 22 receives a current feedback signal based on the voltage across a current sense resistor RSENSE as well as voltage feedback of the DC bus voltage VBUS.

The power converter controller 22 controls the timing of operation of the main control switch M1 for example to deliver a constant current to the lighting load. By controlling the output current, LEDs can be switched in or out of the output load circuit.

During (deep) dimming, the PWM switches will be in the conducting state for most (or all) of the time. The buck converter will still be providing the nominal LED current, but the output voltage will be close to zero. Since a switch-mode power converter architecture is used, there are not excessive losses during this state.

Figure 2:
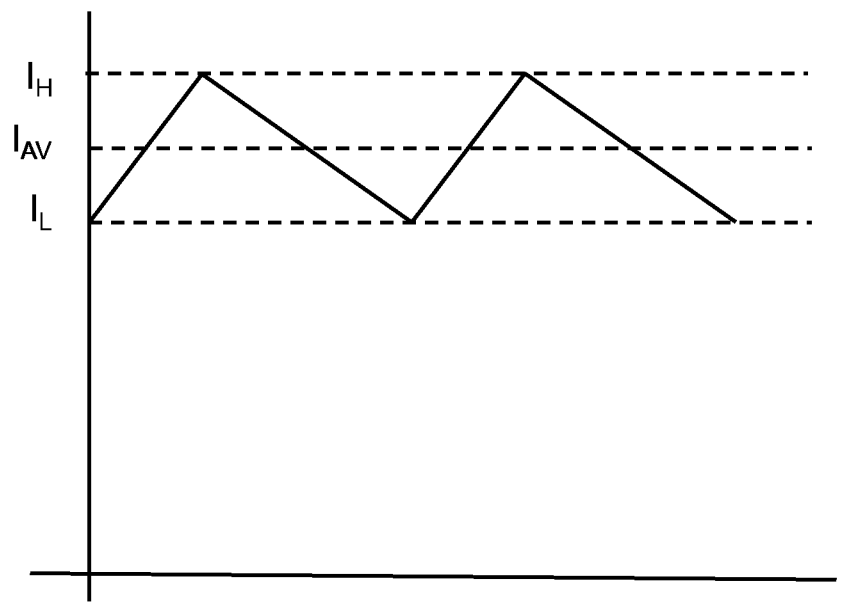
FIG. 2 shows a timing diagram for the circuit of FIG. 1.

The power converter delivers a triangular current waveform as shown in FIG. 2, which cycles between upper and lower threshold currents $I_H$ and $I_L$ respectively. FIG. 2 also shows the average current $I_{AV}$.

Typically, the buck converter frequency such as 200 kHz which is much higher than the PWM frequency such as 1 kHz. However, at very deep dimming levels, the PWM pulse duration will approach or even be below the buck converter switching period. This gives a low frequency current variation and thus visible flicker. Ultimately, it is the sampling of the triangular buck converter output current that leads to the visible flicker.

The invention is based on the recognition that control of the relative timing between the buck converter current waveform and the PWM control can be used to inhibit the flicker. There are three possible ways to reduce the flicker artefacts.

A first approach is to synchronize the PWM signal to a fixed buck converter output state or phase. A second approach is to synchronize the buck converter to a fixed PWM start phase. A third approach is to minimize the ripple current during a predetermined (short) time slot.

This invention is based on the first approach above. It is achieved by delaying the start of the activation pulse of the pulse width modulation controller 20 until a predetermined point within the triangular current waveform of the power converter controller 22.

Figure 3:
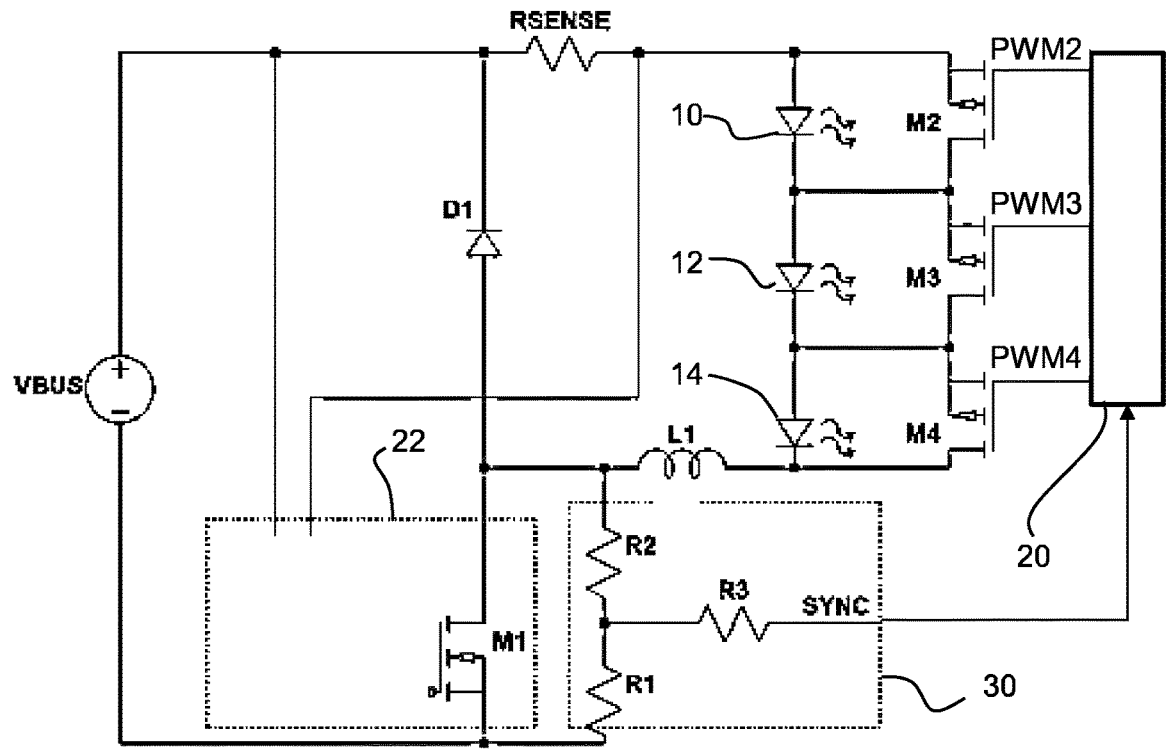
FIG. 3 shows a lighting circuit in accordance with an example of the invention.

FIG. 3 shows one example of a lighting system in accordance with the invention as a modification to the system of FIG. 1. The same reference numbers are used for the same components.

The circuit comprises an additional sync circuit 30. This generates a sync signal "SYNC". The circuit 30 comprises a resistor divider R1, R2 across the main control switch M1 and an output resistor R3 from the node between the resistors R1, R2. When the main control switch M1 is turned on, the signal SYNC is zero as the resistor divider R1, R2 is shorted. When the main control switch M1 is turned off, a current flows through the resistive divider which depends on the voltage across the main control switch, giving a positive sync voltage.

The sync voltage is constant because the drain node of the main control switch M1 alternates between VBUS and ground.

Note that resistors R1 to R3 are not essential; they are provided for adapting the drain node voltage to the sync input for correct PWM generation, if required.

The sync voltage is used as a trigger to the pulse width modulation controller 20.

Due to the combination of the buck converter and the switching operation, the converter frequency is not fixed, but it depends on the input voltage, the LED voltage and the chosen color point.

Since the buck frequency (200 kHz-500 kHz) will typically be much higher than the PWM frequency (less than 25 kHz, e.g. 1 kHz), the exact phase relation between the buck converter output and the start of the next PWM cycle is not easily predictable, and subject to disturbances.

The sync signal is used to resynchronize the light generation pulse generated by the pulse width modulation controller 20. The controller includes a counter which defines the timing of the PWM signal. After the maximum PWM count value has been reached, a resynchronization takes place in the form of an added delay before the light generation pulse commences.

The sync signal is used to identify the predetermined point within the triangular current waveform as mentioned above and this is used as an external trigger mechanism, instead of using a counter auto-reload mechanism.

In the example below, the PWM pulse is at the start of the PWM period, but is delayed until a particular phase of the triangular current waveform. However, the delayed pulse may be provided at an arbitrary phase of the PWM counter. The duration of the pulse remains set at the desired level, even though it has a start which is delayed to the arbitrary phase.

FIG. 3 shows a circuit which detects the on-off state of the switch M1 by externally monitoring the voltage across the switch. However, other signals may be used, such as the gate drive signal of the main control switch M1, the drain voltage of the main control switch M1 or another internal controller signal from the controller 22. A further alternative is to monitor the output current. Thus, the input control to the switch, or the output state of the switch or the output current may be monitored.

The sync signal in these examples is basically used to indicate the timing at which the lower or upper hysteresis level is present in the output current, although any fixed reference point within the period of the current waveform may be used, i.e. any fixed point within the control switch switching cycle.

As soon as the chosen reference point is reached within the PWM period, the pulse will be generated with the predetermined duration.

Figure 4:
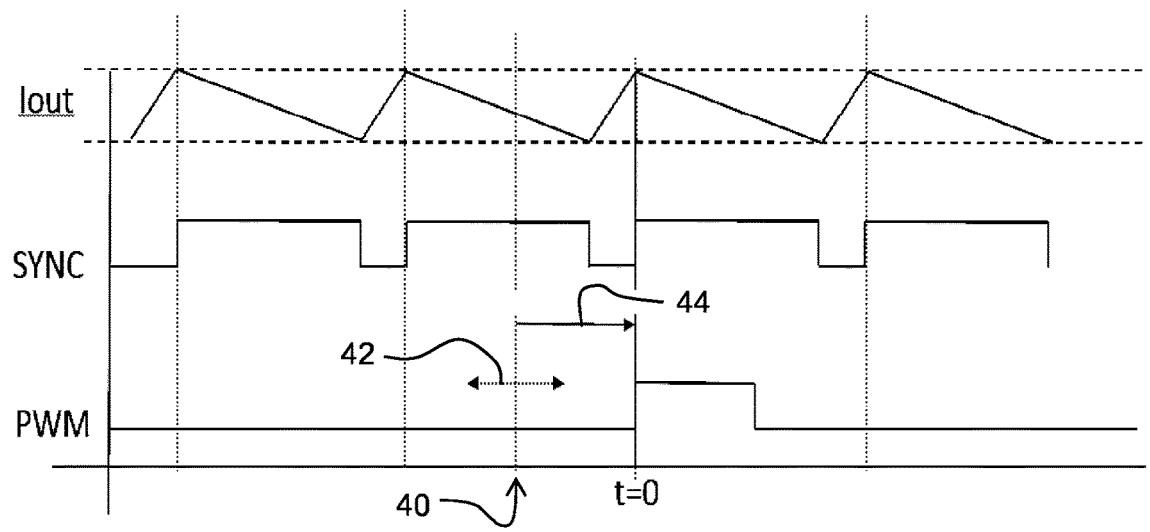
FIG. 4 shows a timing diagram for the circuit of FIG. 1.

FIG. 4 shows the timing of operation of the circuit of FIG. 3, and shows the output current Iout as measured by the sense resistor RSENSE, the sync signal SYNC and the PWM signal "PWM".

The PWM signal in this example is high when the LED is to be turned on, i.e. the LED is shorted and turned off by the low PWM signal. Of course, the control could be the other way around.

The time point 40 in FIG. 4 is the timing at which the PWM period ends, namely when the PWM counter reaches its maximum count and the next PWM cycle starts.

Instead of starting the PWM pulse immediately, the timing of the start of the pulse is variable as represented by arrow 42, and a delay 44 is introduced. The PWM pulse only starts later at the time shown as t=0. In this way, the PWM pulses have fixed timing relative to the triangular waveform.

The interaction of the PWM peripheral circuit and the external control signal are handled by dedicated hardware provisions inside the PWM controller portion of the overall controller IC, but the control can be handled by software control as well.

Figure 5:
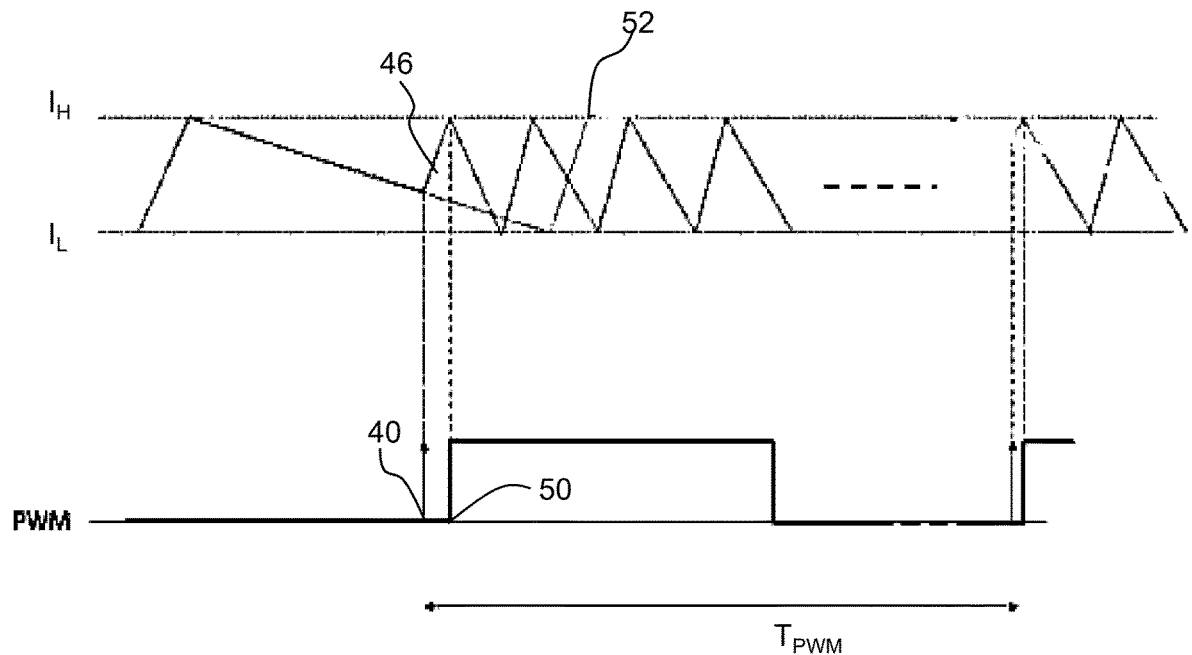
FIG. 5 shows a modified timing diagram for the circuit of FIG. 1.

The delay 44 will slightly alter the timing of the light output pulse. FIG. 5 shows a way to minimize the delay to minimize any effect that the altered timing of the pulse light output pulse may have.

As soon as the desired start of the pulse is reached by the PWM generator, the buck converter may be forced to switch to the ON state. This is at time 40 in FIG. 5. At this point in time, the slow downward slope of the output current is converted into a fast upward slope 46. This is because no LEDs are on in this phase of the PWM signal, which results in a maximum voltage across the inductor of the buck converter. This means the predetermined point in time (which in this example is again when the upper current threshold $I_H$ is reached) is earlier, at time point 50. This is earlier that the time point would have been, which is shown as time point 52.

In this way, the upper hysteresis level will be reached quite quickly after the turn-on of the buck converter switch, and this upper hysteresis level may again be selected as the actual switch-on moment of the LEDs, by turning off the shunt switch.

In one approach, the start of the pulses to the different channels in a multi-channel system are aligned at phase=0 (at the start of the PWM period). It is instead possible to spread the pulses of the PWM period, thus creating different phases for each channel. This could lead to a forced 'ON' of the buck converter (time point 40) and delayed pulse for each of the channels (multiple times per period).

Figure 6:
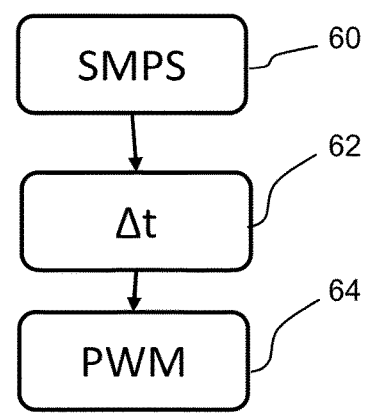
FIG. 6 shows a lighting control method.

FIG. 6 shows a method of controlling a lighting circuit.

The switch mode power converter is operated in step 60 and delivers a triangular current waveform which cycles between upper and lower threshold currents.

In step 62 a delay is provided to the start of the pulse of a PWM signal until a predetermined point within the triangular current waveform.

The pulse width modulation controller is then operated in step 64 for providing a pulse width modulation control signal to a lighting control switch for controlling dimming.

The timing approach described above may be applied during all dimming levels of the lamp including fully on, or it may be applied only during dimming or more particularly only during deep dimming.

The invention is of particular interest for all lamps and luminaires which use the buck converter and shunt switching combination. More generally, the invention is of interest for a converter that is operating in boundary mode (upper current level and zero current), or using other control methods (such as on-time control). The invention may also be applied to arrangements which use series switches.

The invention may be applied to a single string of LEDs or to multiple LED strings in series (as shown).

The example above is based on shunt switching approach whereby each lighting unit has a parallel bypass switch. This has the advantage that a single current source solution is possible for a color system. As mentioned above, an alternative is a series switching approach by which an open switch is used to provide an open circuit and prevent current flowing to the respective lighting unit. In this case, different lighting units are in parallel each with their own series control switch. A voltage-controlled output is then provided by the switch mode power converter.

The approach above is based on delaying the start of the PWM (light activation) pulse within the constant PWM period. As mentioned above, an alternative is to delay the start of the PWM signal itself instead of having an auto-reload function for the generation of the PWM signal. In this case, the reset of the PWM counter only takes place when the reference time point in the current signal is next reached, which in the example above is the upper current threshold at the next rising edge of the SYNC signal. Thus, the timing of the desired start of the pulse is variable by varying the PWM period timing, and a delay is introduced.

This alternative resynchronization mechanism will cause some jitter on the PWM frequency due to the (unpredictable) delay before the pulse will start. The absolute magnitude of the delay is a maximum of one buck control period (i.e. approx. 5 μs). Due to this jitter in PWM period, the actual average light output will have some variance as well, but the magnitude of the flicker is approximated by the ratio of the delay to the nominal PWM period, which will be approximately 0.5%.

This delay may be minimized using the approach explained with reference to FIG. 5.

Thus, it will be seen that there are various different options for altering the timing of the light emission pulse of the PWM control, to ensure that it has a fixed phase relationship with respect to the main controller switching cycle. In all examples above, a delay is applied to the PWM pulse until the main controller switching cycle reaches a desired phase, but this delay may be to the PWM pulse within a fixed PWM period or the delay may be to the whole PWM period.

Other variations to the disclosed embodiments can be understood and effected by those skilled in the art in practicing the claimed invention, from a study of the draw-

The invention claimed is:

1. A lighting circuit, comprising:
   a switch mode power converter having a main control switch;
   a solid state lighting arrangement comprising a lighting unit and a lighting control switch, at the output of the switch mode power converter;
   a pulse width modulation controller for providing a pulse width modulation control signal to the lighting control switch for controlling dimming of the solid state lighting arrangement, the pulse width modulation control signal having a predetermined frequency and period and comprising pulses during which the lighting unit is activated; and
   a power converter controller for controlling the main control switch independently of the pulse width modulation control signal,
   a sync circuit for generating a synchronization signal (SYNC) based on a voltage over the main control switch,
   wherein the switch mode power converter is adapted to deliver a triangular current waveform which cycles between upper and lower threshold currents,
   and wherein the pulse width modulation controller is adapted to delay the start of each of the pulses until a predetermined point within the triangular current waveform, wherein the synchronization signal is used to identify the predetermined point within the triangular current waveform.

2. The lighting circuit as claimed in claim 1, wherein the each of the pulses are at the start of the pulse width modulation control signal, and the pulse width modulation controller is adapted to delay the start of the pulse until said predetermined point within the triangular current waveform.

3. The lighting circuit as claimed in claim 1, wherein the pulse width modulation controller is adapted to delay the start of the pulse until the triangular current waveform reaches a next upper or lower threshold current.

4. The lighting circuit as claimed in claim 3, wherein the pulse width modulation controller is adapted to delay the start of the pulse until the triangular current waveform reaches a next upper threshold current.

5. The lighting circuit as claimed in claim 1, wherein the power converter controller is adapted to switch the main control switch at the start of the pulse width modulation control signal.

6. The lighting circuit as claimed in claim 1, wherein the power converter controller is arranged to operate at a frequency of at least 100 kHz and the predetermined frequency of the pulse width modulation controller is at most 25 kHz.

7. The lighting circuit as claimed in claim 1, wherein the solid state lighting arrangement comprising a plurality of lighting units in series, each with a respective lighting control switch mounted in parallel on each lighting unit.

8. The lighting circuit as claimed in claim 7, wherein each lighting unit has a different output color or color temperature.

9. The lighting circuit as claimed in claim 1, wherein the switch mode power converter comprises a buck converter.

10. A method of controlling a lighting circuit, comprising:
    operating a switch mode power converter having a main control switch to deliver power to a solid state lighting arrangement which comprises a lighting unit and a parallel lighting control switch, wherein the switch mode power converter delivers a triangular current waveform which cycles between upper and lower threshold currents;
    generating a synchronization signal (SYNC) based on a voltage over the main control switch;
    operating a pulse width modulation controller for providing a pulse width modulation control signal to the lighting control switch for controlling dimming of the solid state lighting arrangement, the pulse width modulation control signal having a predetermined frequency and period and comprising pulses during which the lighting unit is activated; and
    wherein the switch mode power converter is controlled independently of the pulse width modulation control signal and wherein the method further comprises:
    delaying the start of each of the pulses until a predetermined point within the triangular current waveform, wherein the synchronization signal is used to identify the predetermined point within the triangular current waveform.

11. The method as claimed in claim 10, wherein the pulse is nominally at the start of the pulse width modulation control signal, and the method comprises delaying the start of the pulse until said predetermined point within the triangular current waveform.

12. The method as claimed in claim 10, comprising delaying the start of the pulse until the triangular current waveform reaches a next upper or lower threshold current.

13. The method as claimed in claim 12, comprising delaying the start of the pulse until the triangular current waveform reaches a next upper threshold current.

14. The method as claimed in claim 10 comprising switching the main control switch of the switch mode power converter at the start of the pulse width modulation control signal.

15. The method as claimed in claim 10, comprising operating the power converter controller at a frequency of at least 100 kHz and operating the pulse width modulation controller at the predetermined frequency of at most 25 kHz.

* * * * *